United States Patent [19]
Clave et al.

[11] 3,871,741
[45] Mar. 18, 1975

[54] COMPACT OPTICAL SYSTEM PERMITTING INSTANTANEOUS INCREASE IN MAGNIFICATION WITHOUT REFOCUSSING

[76] Inventors: Serge Clave; Marcel Clave, both of 9 rue Oliver Metra, Paris, France 75020

[22] Filed: Apr. 19, 1973

[21] Appl. No.: 352,610

[30] Foreign Application Priority Data
Apr. 26, 1972   France .............................. 72.14870

[52] U.S. Cl. ...................... 350/37, 350/34, 350/48, 350/183
[51] Int. Cl. .............................................. G02b 7/04
[58] Field of Search ................................ 350/37–39, 350/20, 34, 48, 183

[56] References Cited
UNITED STATES PATENTS

| | | | |
|---|---|---|---|
| 3,407,302 | 10/1968 | Bouwers | 350/34 X |
| 3,458,244 | 7/1969 | Klein | 350/43 |
| 3,459,464 | 8/1969 | Smith | 350/34 X |
| 3,645,602 | 2/1972 | Clave et al. | 350/38 X |

*Primary Examiner*—David H. Rubin
*Attorney, Agent, or Firm*—Brisebois & Kruger

[57] ABSTRACT

Optical system comprises mirror mounted to swing between a first position in which light from an objective passes through an image amplifier and stationary reflecting means to an objective and a second position by-passing said amplifier and stationary reflecting means, the difference between the lengths of the light paths resulting from the two positions being such as to compensate for the increase in the distance between the objective and image when the image amplifier is in the light path.

5 Claims, 4 Drawing Figures

COMPACT OPTICAL SYSTEM PERMITTING INSTANTANEOUS INCREASE IN MAGNIFICATION WITHOUT REFOCUSSING

SUMMARY OF THE INVENTION

Applicants have described in their prior U.S. Pat. No. 3,645,602, means for increasing the magnification of the image of a stationary object formed by an optical device, without changing the position of that image, by inserting a Barlow amplifier in the optical path of the light rays leaving said device.

The results described in said prior patent were achieved by rotating three optical components having reflecting surfaces and said Barlow amplilfier, through 90° or 180°, so that light rays from said object are reflected by only one surface when the Barlow amplifier is not inserted in the optical path, but the length of said path is increased by subjecting said light rays to three reflections when said Barlow amplifier is inserted in said path.

Independently of the three optical members fixed to a mounting for rotating them, certain embodiments of our prior invention also comprises stationary reflectors which were effective only in the one of the two extreme positions of said mounting in which said Barlow amplifier is inserted in the optical path.

It should also be noted that, in certain other embodiments, such as those illustrated in FIGS. 14-17 of said patent, the increase in the number of reflections after insertion of the Barlow amplifier is four instead of two.

It is the object of the present invention to decrease the weight of the members which must be rotated in order to alter the magnification of the image.

The invention utilizes a stationary Barlow amplifier which is constantly associated with a group of two plane reflecting surfaces, which are both stationary and perpendicular to each other, and a flat mirror capable of turning through 90° between two extreme positions about an axis passing along one of its edges. This mirror is mounted upstream of the Barlow amplifier so as to make it possible in one of its extreme positions, to deflect the light rays from the Barlow amplifier and the two stationary reflecting surfaces, said light rays then passing, on the contrary, through said amplifier in the other extreme position of the mirror before being reflected by said reflecting surfaces.

It is easy to understand that by reducing the number of optical elements which must be rotated in order to modify the magnification of the image to a single plane mirror, and by correspondingly substantially reducing the weight thereof, this rotation may be more easily and accurately carried out due to the smaller inertia of said mirror.

It will also be noted that the optical paths which, in most of the embodiments of U.S. Pat. No. 3,645,602, have points at which the light rays cross after insertion of the Barlow amplifier, have no such points in the embodiments according to the present invention.

The characteristics of the present invention will be better understood from a reading of the following description of two embodiments thereof, which are given purely by way of illustration and example, with reference to the accompanying drawings on which:

Figure 3:
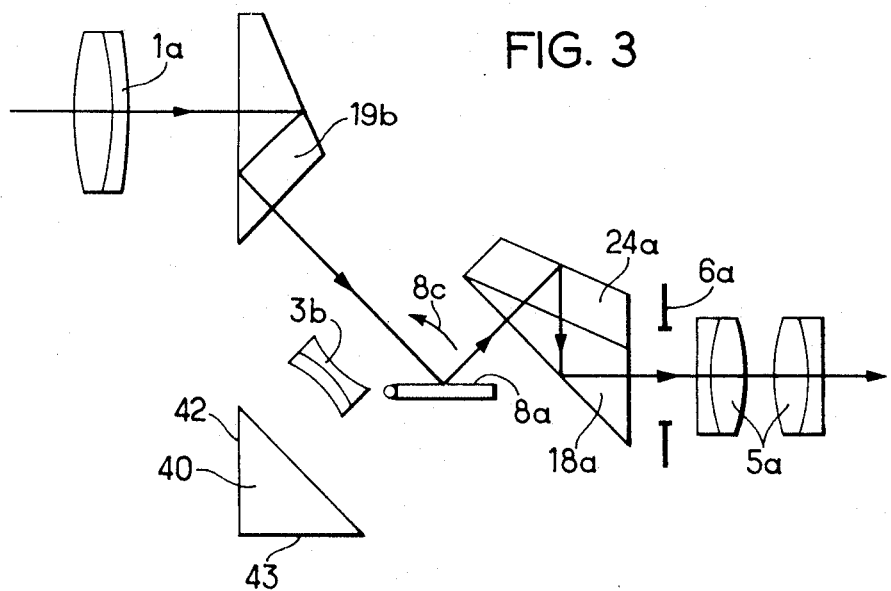
Figure 4:
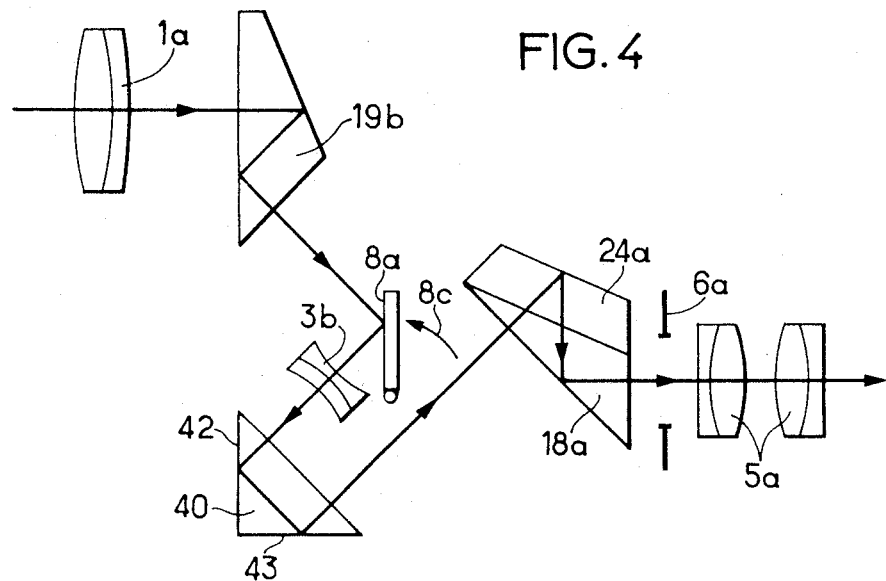

FIG. 3 is a schematic view illustrating the adaption of the invention to binoculars providing a re-erected image and an increased stereoscopic effect comparable to that provided by the embodiment of FIG. 10 of U.S. Pat. No. 3,645,602, but comprising only a single pivotally mounted mirror; and FIG. 4 is a schematic view, comparable to FIG. 11 of U.S. Pat. No. 3,645,602, showing the longer optical path traversed by the light rays after rotation of said pivotally mounted mirror through 90°, which optical path passes through said Barlow amplifier and includes two supplemental reflections at the totally reflective surfaces of a stationary 90° prism.

Figure 1:
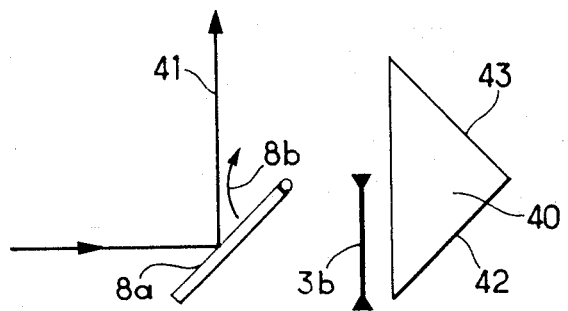
FIG. 1 is a schematic view of an optical device according to the present invention utilizing a stationary prism having two totally reflective surfaces as well as a pivotally mounted mirror, shown in the position in which the Barlow amplifier is excluded from the optical path.

FIG. 1 shows the stationary Barlow amplifier 3b, the pivotally mounted mirror 8a, and the stationary prism 40 having two totally reflective surfaces. The light rays reflected by the mirror 8a follow an optical path 41 without passing through the Barlow amplifier 3b and therefore never reach the two totally reflective surfaces 42 and 43 of prism 40.

Figure 2:
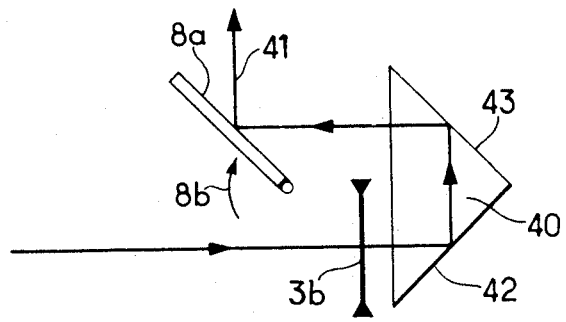
FIG. 2 is a schematic view showing the same device after the mirror has been pivoted through 90°, showing the new and longer optical path traversed by the light rays after insertion of the amplifier to obtain an increased magnification.

When the mirror 8a is turned 90° in the direction of the arrow 8b to reach the position shown in FIG. 2, the light rays pass through the Barlow amplifier 3b, are reflected by the two totally reflective surfaces 42 and 43 of the stationary prism 40, and by the mirror 8a, before returning to the optical path 41.

By comparing the optical paths followed by the light rays on FIGS. 1 and 2, it will be appreciated that the insertion of the Barlow amplifier 3b in the optical path has caused an increase in the length of this optical path, largely in air, but also through the glass of the prism 40.

The same reference numerals as were used in FIGS. 10 and 11 of U.S. Pat. No. 3,645,602 are employed in FIGS. 3 and 4 of this application, with only slight modifications.

The objective 1a directs light rays onto a prism 19b from which they are reflected to a mirror 8a positioned parallel to the light rays from the objective 1a.

The rays reflected by the mirror 8a reach a prism 18a having a roof-shaped surface 24a by which it is twice reflected, before reaching the eyepiece 5a. The image is formed in the plane of a diaphragm 6a.

The two stationary reflective surfaces. are the two totally reflective surfaces of a 40°-90° prism, and the Barlow amplifier carries reference numeral 3b.

FIG. 4 shows the same components, but the reflective surface of the mirror 8a has been rotated through 90° in the direction of the arrow 8c. The light ray reflected by this mirror then pass through the Barlow amplifier 3b before being reflected by the two totally reflective surfaces 42 and 43 to the prism 18a.

In this embodiment, as in the one illustrated in FIGS. 1 and 2, the increase in the length of the optical path is partly in air and partly in the material of which the prism 40 is made.

It will, of course, be appreciated that the embodiments which have just been described have been given purely by way of example and may be modified as to detail without thereby departing from the basic principles of the invention.

What is claimed is:

1. An optical system comprising:
    an eyepiece,
    an objective,
    movable reflecting means pivotally mounted between said eyepiece and objective to swing between a first position and a second position,
    stationary reflecting means, and
    stationary image-amplifying means,
    said movable reflecting means being positioned to reflect light rays from said objective to said eyepiece along a first patch excluding said image-amplifying means and stationary reflecting means, when said reflecting means is in said first position, and to reflect light rays from said objective to said eyepiece along a second path from said objective to said eyepiece including said stationary reflecting means and said image-amplifying means when said movable reflecting means is in said second position,
    said second optical path being longer than said first optical path by a distance equal to the increase in the distance between said objective and the image formed thereby resulting from the inclusion of said image-amplifying means in said second optical path.

2. An optical system comprising:
    an eyepiece,
    an objective,
    movable reflecting means pivotally mounted between said eyepiece and objective to swing between a first position and a second position,
    first stationary reflective means defining with said movable reflecting means a first optical path traversed by light rays passing from said objective to said eyepiece when said movable reflecting means occupies said first position,
    stationary image-amplifying means, and
    additional stationary reflecting means,
    said image-amplifying means and additional stationary reflecting means defining with said movable reflecting means and said first stationary reflecting means a second optical path traversed by light rays passing from said objective to said eyepiece when said movable reflecting means is in said second position,
    said second optical path being longer than said first optical path by a distance equal to the increase in the distance between said objective and the image formed thereby resulting from the inclusion of said image-amplifying means in said second optical path.

3. An optical system as claimed in claim 1 in which said movable reflecting means reflects light from said objective to said image amplifying means when in said second position and reflects light from said objective to said eyepiece when in said first position.

4. An optical system as claimed in claim 1 in which said stationary reflecting means comprises a pair of plane reflecting surfaces positioned at an angle to each other bisected by a plane parallel to the initial path of travel of an axial ray of light from said objective to a first one of said stationary reflective surfaces so that said ray is reflected by said first stationary reflective surface to the other stationary reflective surface and thence backward parallel to the path travelled when it struck said first stationary reflective surface.

5. Optical system as claimed in claim 1 in which neither optical path crosses itself at any point.

* * * * *